United States Patent [19]

Middlebrook

[11] Patent Number: 5,181,382
[45] Date of Patent: Jan. 26, 1993

[54] HEATING/COOLING OR WARMING STAGE ASSEMBLY WITH COVERSLIP CHAMBER ASSEMBLY AND PERFUSION FLUID PREHEATER/COOLER ASSEMBLY

[76] Inventor: Thomas F. Middlebrook, 25570 Lehmann Blvd., Lake Villa, Ill. 60046

[21] Appl. No.: 739,454

[22] Filed: Aug. 2, 1991

[51] Int. Cl.[5] .................... G02B 21/28; G02B 21/30
[52] U.S. Cl. ..................... 62/3.2; 219/201; 359/395; 359/398
[58] Field of Search ............... 62/3.2, DIG. 10, 3.7; 359/395, 398; 219/201

[56] References Cited

U.S. PATENT DOCUMENTS

| | | | |
|---|---|---|---|
| 1,609,129 | 11/1926 | Roberts | 219/201 |
| 2,228,906 | 1/1941 | Bowen | 359/395 |
| 2,232,354 | 2/1941 | Weygand | 219/201 X |
| 3,399,536 | 9/1968 | Walz | 62/3.2 |
| 3,580,658 | 5/1971 | Swanson | 350/93 |
| 3,701,580 | 10/1972 | Sobajima | 359/395 |
| 4,066,365 | 1/1978 | Staunton | 359/395 |
| 4,629,862 | 12/1986 | Kitagawa et al. | 219/200 |
| 4,707,086 | 11/1987 | Dahan et al. | 359/398 |
| 4,888,463 | 12/1989 | Middlebrook | 219/201 |

Primary Examiner—Henry A. Bennet
Assistant Examiner—William C. Doerrler
Attorney, Agent, or Firm—Thomas R. Vigil

[57] ABSTRACT

The stage assembly for use in a microscope comprises a mechanical stage having an opening therein, a stage support plate having an opening therethrough, a support for supporting the stage support plate in the opening in the mechanical stage, a device for heating/cooling or warming the stage support plate mounted to the stage support plate, a specimen chamber/coverslip assembly mounted on the stage support plate above the opening therethrough, a perfusion fluid preheater/cooler assembly mounted on the support plate, a perfusion fluid tubing extends through the preheater/cooler assembly and to a specimen chamber in the specimen chamber/coverslip assembly, and a conduit for withdrawing perfusion fluid from the specimen chamber.

17 Claims, 6 Drawing Sheets

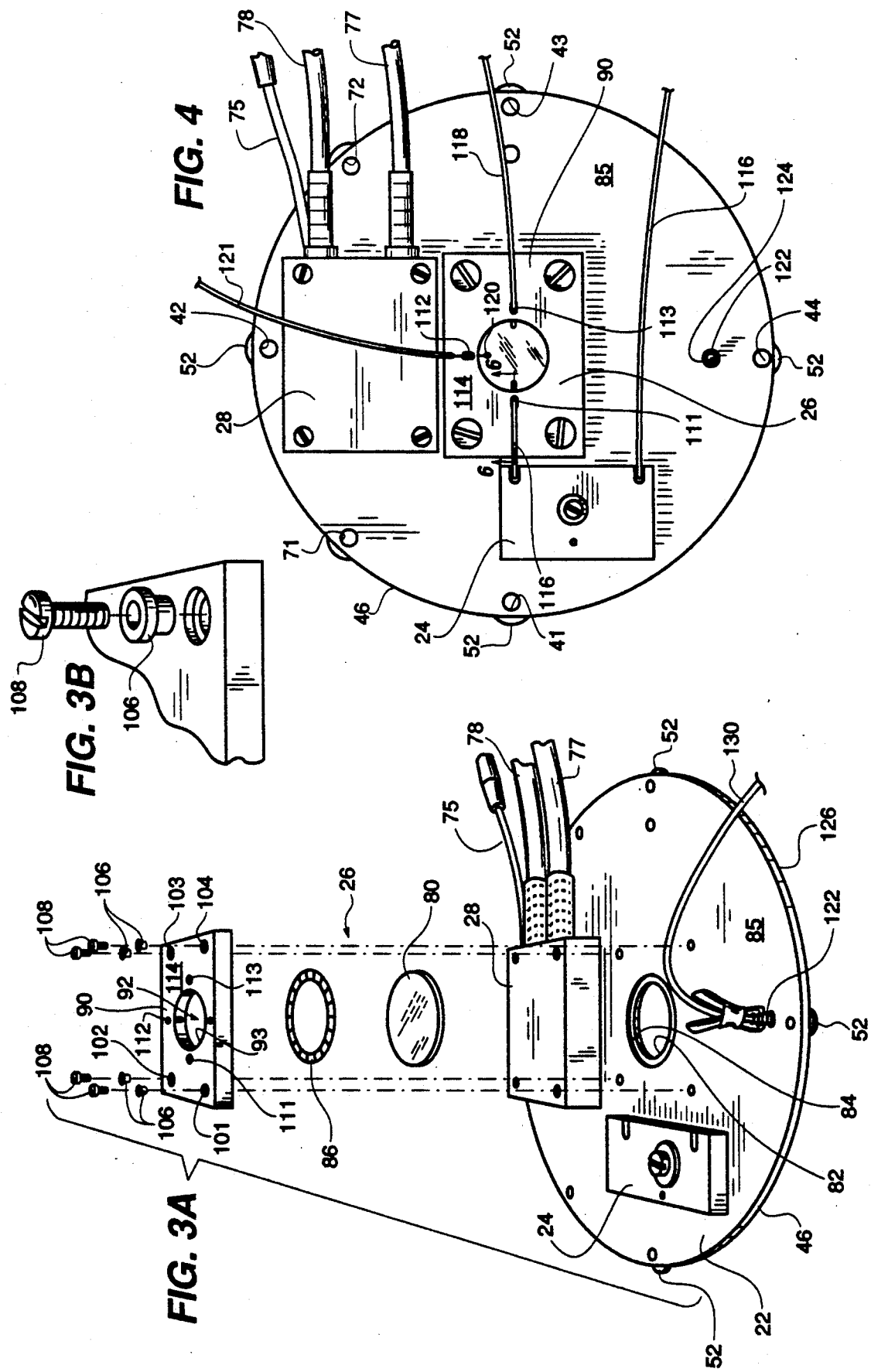

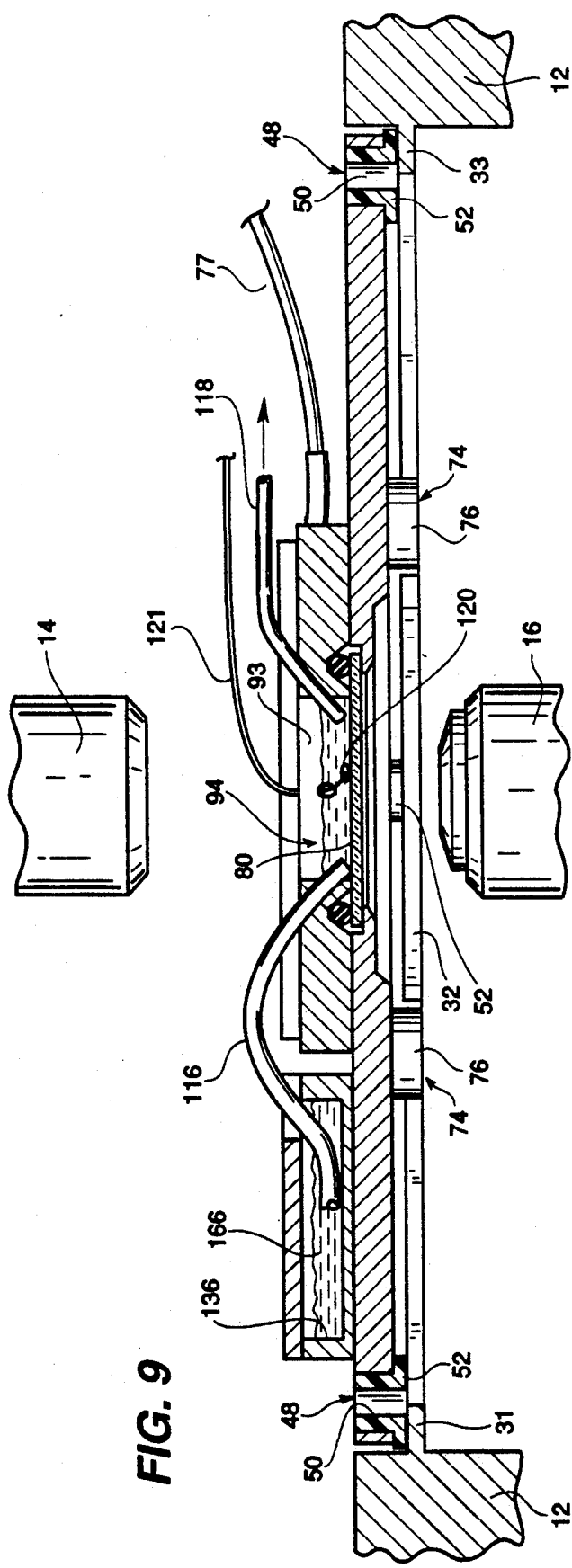
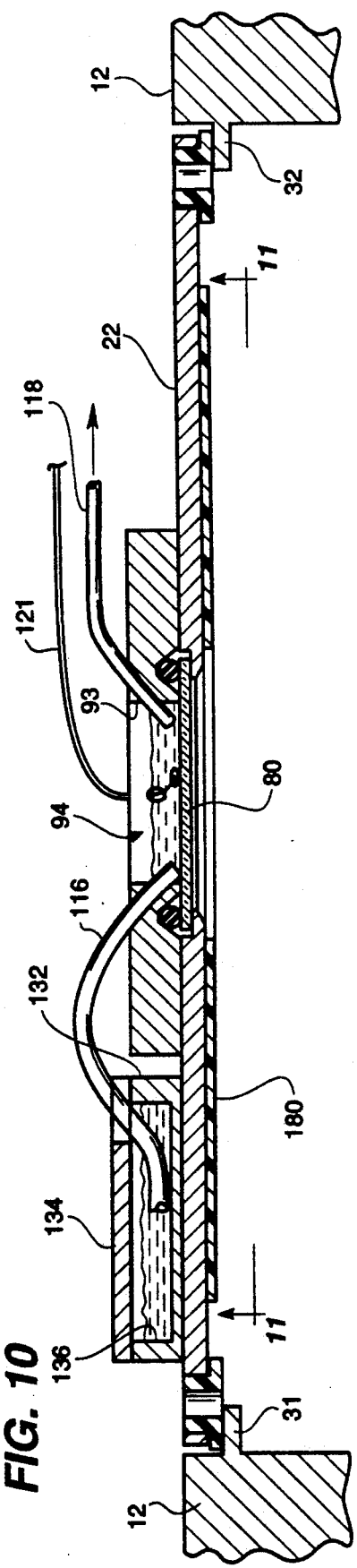
FIG. 9
FIG. 10

HEATING/COOLING OR WARMING STAGE ASSEMBLY WITH COVERSLIP CHAMBER ASSEMBLY AND PERFUSION FLUID PREHEATER/COOLER ASSEMBLY

BACKGROUND OF THE INVENTION

1. Field of the Invention

The present invention relates to an improved stage assembly for a microscope. The stage assembly includes a perfusion fluid preheater/cooler assembly and a coverslip chamber assembly mounted on a mechanical stage for a microscope.

More specifically, the present invention relates to an improved heating/cooling or warming stage including a perfusion fluid pre-heater/cooler assembly and an improved specimen chamber/coverslip assembly.

2. Description of the related art including information disclosed under 37 CFR 2121 1.97-1.99

Various techniques, methods and apparatus have been proposed for controlling the temperature of a specimen on a microscope stage.

The present invention relates to a tissue culture vessel for high power examination of cells and tissues on a microscope.

Current problems associated with apparatus now in the marketplace relate to their large chamber circumferences and their large respective volumes. A primary goal of previous designs has been to allow the use of high magnification and oil immersion objective lenses having extremely short working distances on inverted microscopes. To achieve this, the underside circumference of the chamber vessel must allow for sufficient scanning movement of the objective lens at very close proximity to the coverslip. (Working distances for oil immersion objective lenses can be as little as 0.14 mm/0.0055"). Unfortunately, these designs resulted in chamber perimeters substantially identical to the subchamber perimeters. (See U.S. Pat. No. 4,435,508 described below—the Chamber/Dish by Bionque Laboratories—The Microscope Tissue Chamber by Biophysica Technologies Inc.—and the Leiden Coverslip Dish sold through Medical Systems Corp.) Typical chamber diameters are at least 25 mms for these products.

One undesirable situation occurs when a rapid solution exchange is required, especially when the perfused fluid contains an expensive, experimental drug. A large volume slows the solution exchange rate increasing downtime between achieving the desired drug concentration and the intracellular response. When this procedure is repeated several times to verify a causal response, a significant amount of the experimental drug is consumed.

A second drawback relates to the thermal inertia of the available tissue chamber apparatus. The chamber wall surfaces are constructed of a combination of chemically inert substances, such as Teflon and silicone rubber in substantially thick sections. Both materials, having low coefficients of thermal conductivity, slow the transfer of thermal energy to the chamber bath.

A third problem relates to temperature gradients common in radially heated or cooled static chamber baths. The larger the chamber circumference, the larger the temperature gradient.

Some of the devices which must access the chamber bath, such as perfusion tubing, aspiration tubing, and a temperature probe, have conventionally been positioned using magnetic-based holders or with a magnetic ring surrounding the chamber. These have typically been bulky devices which compete for available space with micromanipulator devices, microelectrodes, etc.

During perfusion procedures, such as when continuous nutrient/waste exchanges occur and when therapeutic agents are introduced intermittently, a need arises for the thermoregulation of the perfused medium prior to its entry into the chamber bath. Without the prior heating/cooling of the perfused medium, both temperature oscillations and gradients will occur in the chamber bath. Conventional methods heat or cool the medium to a preset temperature at a point removed from the chamber bath. Through various means, such as pumping, or a controlled gravity flow, the medium is transported to the chamber bath via various types of tubing. If the transportation distance is anything but very short, the tubing itself will act as a thermal sink and affect the perfusion medium temperature.

Another associated problem occurs during an experiment requiring a quick and simultaneous raising or lowering of the chamber bath and perfusion medium temperatures. Even with the use of two independent, time and temperature programmable controller systems, uniform temperature tracking is difficult.

One proposed apparatus for maintaining thermal control of the temperature of a microscope stage is disclosed in the Middlebrook U.S. Pat. No. 4,888,463. This patent discloses a heating device which comprises a planar member having a pattern of non-inductive electrical heating means on one surface thereof adapted to be placed onto the stage of a microscope for providing heat to a specimen within a container mounted on the stage.

Also, there is disclosed in the Kitagawa et al U.S. Pat. No. 4,629,862 a sample heater for use in microscopes which includes a platform supporting thereon a sample container and a heater for heating at least a part of the platform.

Further, there is disclosed in the Papas U.S. Pat. No. 4,195,131 for use with a tissue or specimen receiving vessel such as a petri dish, an environmentally controlled unit which includes a sealable chamber in blocks of the unit which have passageways through and around the sealable chamber for providing a controlled flow of fluid throughout the chamber and an additional flow of temperature controlling fluid within the block of the unit adjacent to the blocks containing the sealable chamber.

Still further, there is disclosed in the Gabridge U.S. Pat. No. 4,435,508 a tissue culture vessel comprising two rigid plates with aligned apertures with the upper plate separated from the lower plate by a rubber gasket.

As will be described in greater detail hereinafter, the heating/cooling or warming stage with specimen chamber coverslip assembly and perfusion fluid preheater/cooler assembly of the present invention differs from the previously proposed microscope stages with heating systems therefor by providing, on a stage support plate, a perfusion fluid preheating/cooling assembly for maintaining the temperature of the perfusion fluid injected into the specimen chamber above the coverslip at the same temperature as the temperature of the fluid in the specimen chamber and by providing an improved plate containing the specimen chamber mounted above the coverslip on the stage support plate.

The heating/cooling or warming stage with coverslip assembly of the present invention provides a coverslip chamber assembly which includes a specimen chamber which is mounted on a stage support plate mounted on a mechanical stage and thermally coupled to the stage support plate which is electrically and thermally isolated from the mechanical stage.

Also, the heating/cooling or warming stage with coverslip assembly of the present invention provides a specimen chamber of reduced diameter and volume capacity, while maintaining the standard sized subchamber diameter necessary for optical scanning when using high magnification or oil immersion objective lenses.

SUMMARY OF THE INVENTION

According to the present invention, there is provided a stage assembly for use in a microscope comprising:
a mechanical stage having an opening therein;
a stage support plate having an opening therethrough;
means for supporting the stage support plate in the opening in the mechanical stage;
means for heating/cooling or warming the stage support plate mounted to the support plate;
a specimen chamber/coverslip assembly mounted on the support plate above the opening therethrough;
a perfusion fluid preheater/cooler assembly mounted on the support plate;
a perfusion fluid tubing extending through the preheater/cooler assembly and to a specimen chamber in the specimen chamber/coverslip assembly; and
means for withdrawing perfusion fluid from the specimen chamber.

Further according to the invention, the preheater/cooler assembly comprises a metal block fixed to the support plate and having a passageway therethrough filled with heat transfer liquid, the perfusion fluid tubing being received through the passageway.

Still further according to the invention, the specimen chamber/coverslip assembly includes a heat conducting plate having a cylindrical opening therein in registry with the opening in the support plate, a coverslip glass located beneath the plate and in contact with the area of the support plate around the openings therethrough, and annular sealing means between the underside of the plate and the upper surface of the coverslip glass. The specimen chamber plate has a first dielectric coating and a second outer coating of polytetrafluoroethylene thereby to minimize contamination of a specimen or specimen fluid received in a specimen chamber defined between the coverslip glass and the polytetrafluoroethylene coated wall of the opening through the specimen chamber plate.

BRIEF DESCRIPTION OF THE DRAWINGS

FIG. 3A is an exploded perspective view of the specimen chamber/coverslip assembly relative to the support plate.

FIG. 3B is a fragmentary perspective corner view of a plate containing the specimen chamber and shows a plastic shoulder washer which is received in a counterbored hole in the plate and through which a machine screw is received.

FIG. 4 is a top plan view of the stage support plate with the preheater/cooler assembly and the specimen chamber/coverslip assembly mounted thereon.

FIG. 9 is a vertical sectional view through one embodiment of the stage support plate having a combination heat exchanger/Peltier module mounted thereon and is taken along line 9—9 of FIG. 1.

FIG. 10 is a vertical sectional view through another embodiment of the stage support plate similar to the view shown in FIG. 9 but without a combination heat exchanger/Peltier module and with a sheet heater mounted to the underside of the stage support plate.

BRIEF DESCRIPTION OF THE PREFERRED EMBODIMENT(S)

Figure 1:
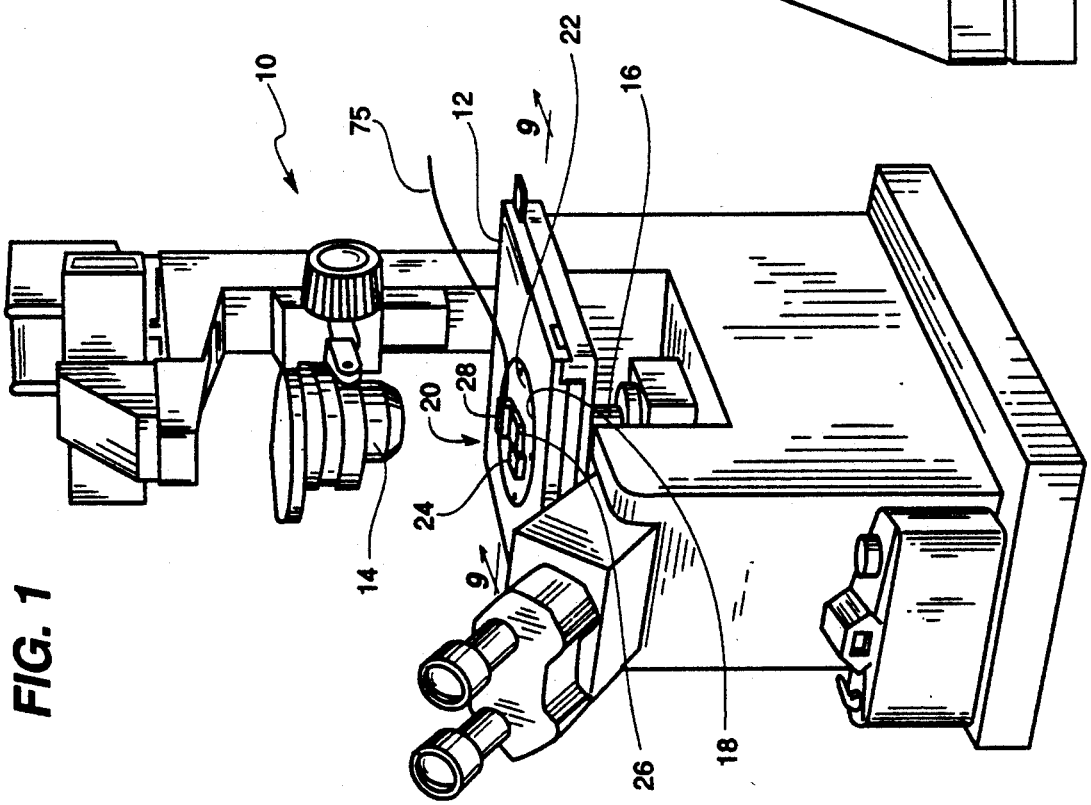
FIG. 1 is a perspective view of a light microscope within which there is mounted a stage assembly constructed according to the teachings of the present invention.

Referring now to the drawings in greater detail, there is illustrated in FIG. 1 a microscope 10 which has a mechanical stage 12 mounted between an upper condenser lens 14 and a lower objective lens 16. Supported on and within a cylindrical opening 18 in the middle of the mechanical stage 12 is a heating/cooling or warming stage assembly 20 including a stage support plate 22 having a perfusion fluid preheater/cooler assembly 24 and a specimen chamber coverslip assembly 26 constructed according to the teachings of the present invention.

A conventional combination heat transfer/Peltier module assembly 28 can also be mounted on the stage support plate 22 as shown.

Further according to the teachings of the present invention, the mechanical stage 12 used in the microscope 10 has a top surface 30 defining a microscope platform 30 and has four stage insert ring supports on ledges 31, 32, 33, and 34 (FIG. 2) located 90° from one another in the opening 18 recessed below the microscope platform 30 of the mechanical stage 12 and extending radically inwardly from a cylindrical wall 36 of the opening 18.

As shown in FIG. 4, the stage support plate 22 has four equidistant holes 41, 42, 43, and 44 located 90° from each other and adjacent on outer peripheral edge 46 of the stage support plate 22.

As best shown in FIGS. 9 and 10, each of these holes receives a hat-shaped plastic insert 48 which is typically a nylon shoulder washer 48. These hat-shaped washers 48, comprising a hollow stem 50 and a larger-in-diameter annular flange 52, have the advantage that they are press-fitted into the holes 41–44 and are firmly secured therein with a portion of each annular flange 52 of each shoulder washer 48 extending beyond the other peripheral edge 46 of the stage support plate 22 so as to space the stage support plate 22 from the wall 36 of the cylindrical opening 18 in the mechanical stage 12 cylindrical.

It has been found by the present inventor that flat nylon washers secured to a stage plate by adhesive came off in the field, since the adhesive did not bond well to the nylon washers.

Extending radically inwardly from the cylindrical wall 36 of this cylindrical opening 18 are the four equally spaced apart, ledges 31–34. Two of the ledges 31 and 33 opposed to each other have a linear cord outer edge 56 and the other two ledges 32 and 34 have an arcuate outer edge 58 and respective side edges 61 and 62.

Mounted on or supported on the ledges 31–34 in the opening 18 in the mechanical stage 12 are the annular flanges 52 of the nylon shoulder washer 48.

As shown in FIGS. 9 and 10, a portion of each annular flange 52 extends outwardly from the outer peripheral edge 46 of the support plate 22 and serves as a spacer for maintaining the support plate 22 spaced from the cylindrical wall 36 in the cylindrical opening 18 of the mechanical stage 12. These nylon washers 48 serve as thermal and electrical insulators for insulating the support plate 22 from the mechanical stage 12, and it will be noted that an edge of each annular flange 52 extending beyond the peripheral edge 46 of the stage support plate 22 is positioned adjacent the cylindrical wall 36 to maintain the support plate 22 spaced from the cylindrical wall 36. This ensures that there is an air gap between the peripheral edge 46 of the support plate 22 and the cylindrical wall 36 of the cylindrical opening 18 in the mechanical stage 12.

Figure 11:
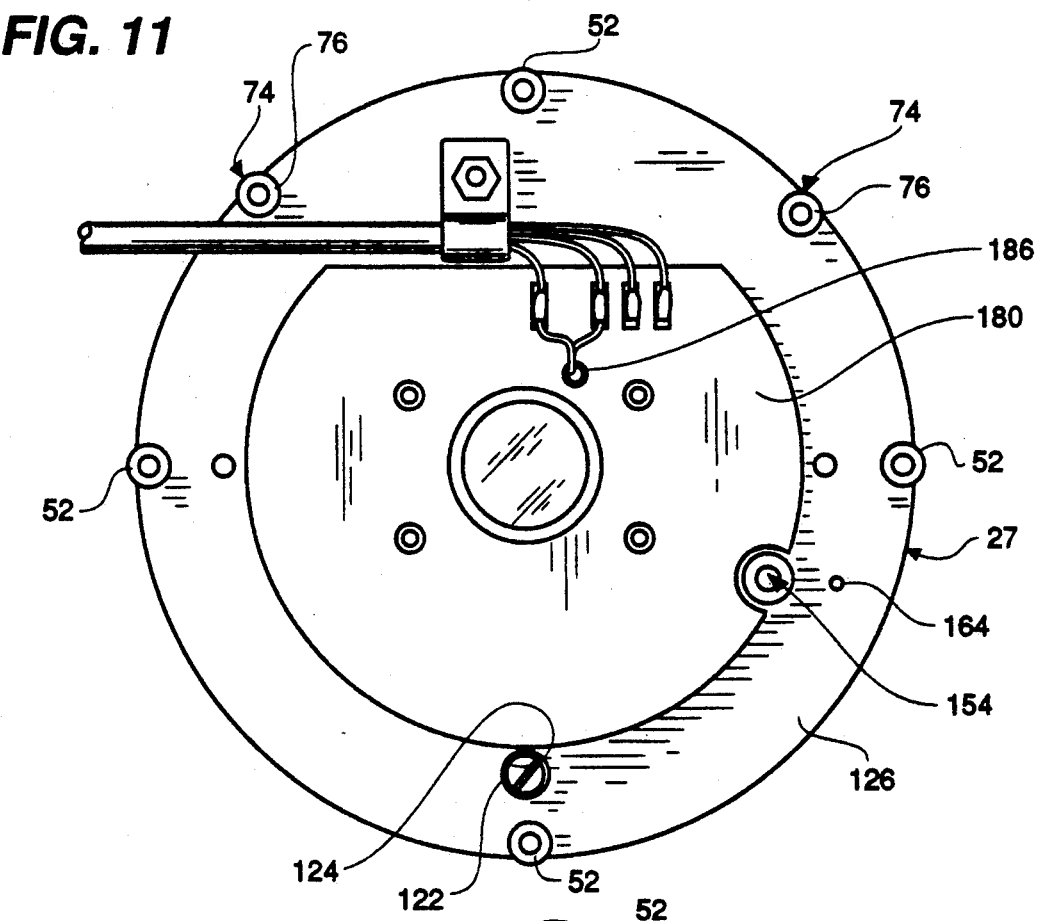
FIG. 11 is a bottom plan view of the stage support plate shown in FIG. 10 with the sheet heater mounted thereon.

Also, and as best shown in FIG. 4, two additional holes 71 and 72 are provided in the support plate 22 spaced from each other along a cord of the peripheral edge 46 and each of these holes 71, 72 has a nylon shoulder washer 74, as shown in FIG. 11, mounted therein. These shoulder washers 74 have a thicker annular flange 76 (FIG. 9) at one end thereof and serve as locating stops which are adjacent to or engage the side edges 61 and 62 of one of the two ledges 32 or 34 for preventing rotation of the stage support plate 22 within the cylindrical opening 18.

Figure 2:
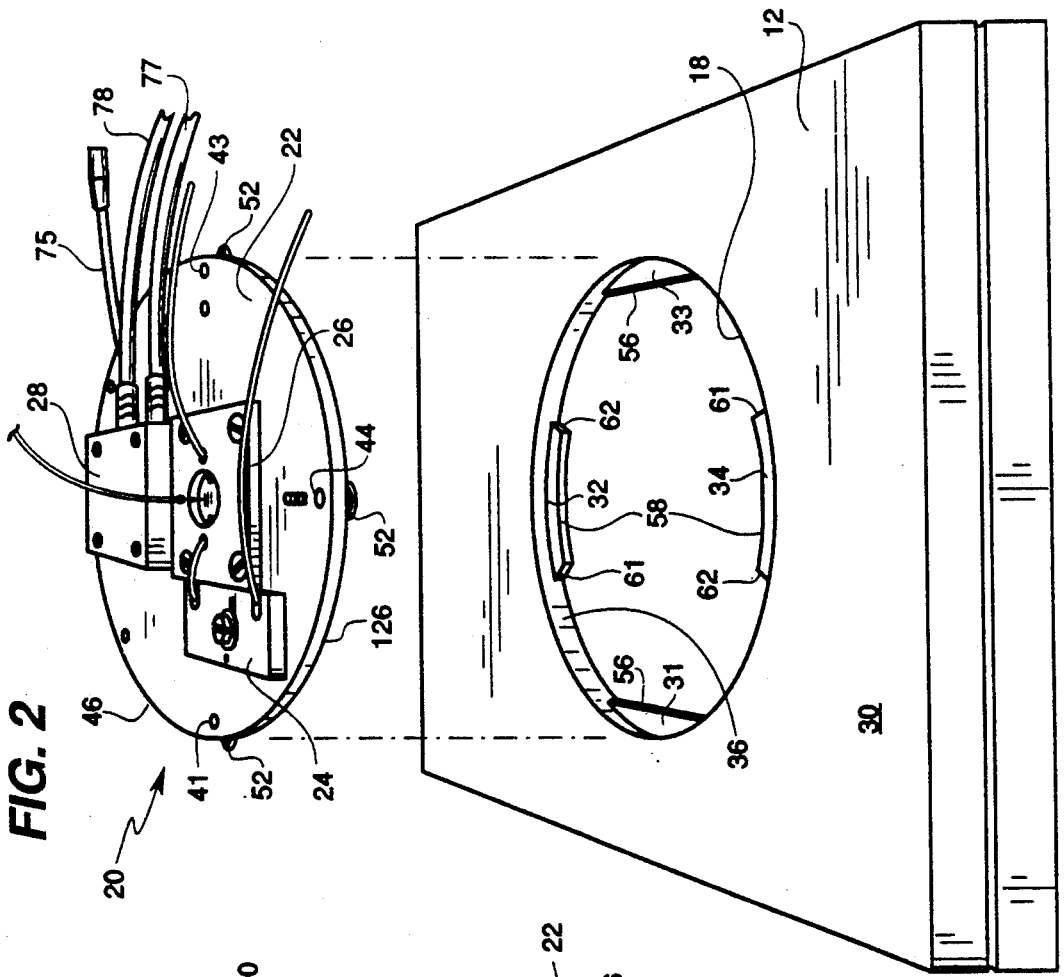
FIG. 2 is a perspective view of a mechanical stage mounted in the light microscope of FIG. 1 with a stage support plate having a perfusion fluid preheater/cooler assembly and specimen chamber/coverslip assembly mounted thereon which is supported in the mechanical stage.

Returning now to FIGS. 1 and 2, it will be apparent that the stage support plate 22 has the three assemblies 24, 26, 28 mounted thereon. The assembly 28 is the conventional combination heat transfer/Peltier module 28 which is utilized for heating or cooling the support plate 22. For this purpose as shown in FIG. 2, the assembly 28 has an electrical connection 75 and inlet and outlet tubings 77 and 78.

The perfusion heater/cooler assembly 24 mounted on the stage support plate 22 as well as the specimen chamber/coverslip assembly 26 also mounted on the stage support plate 22 can be utilized with or without the combination heat transfer/Peltier module 28, as will be described in greater detail hereinafter.

Figure 6:
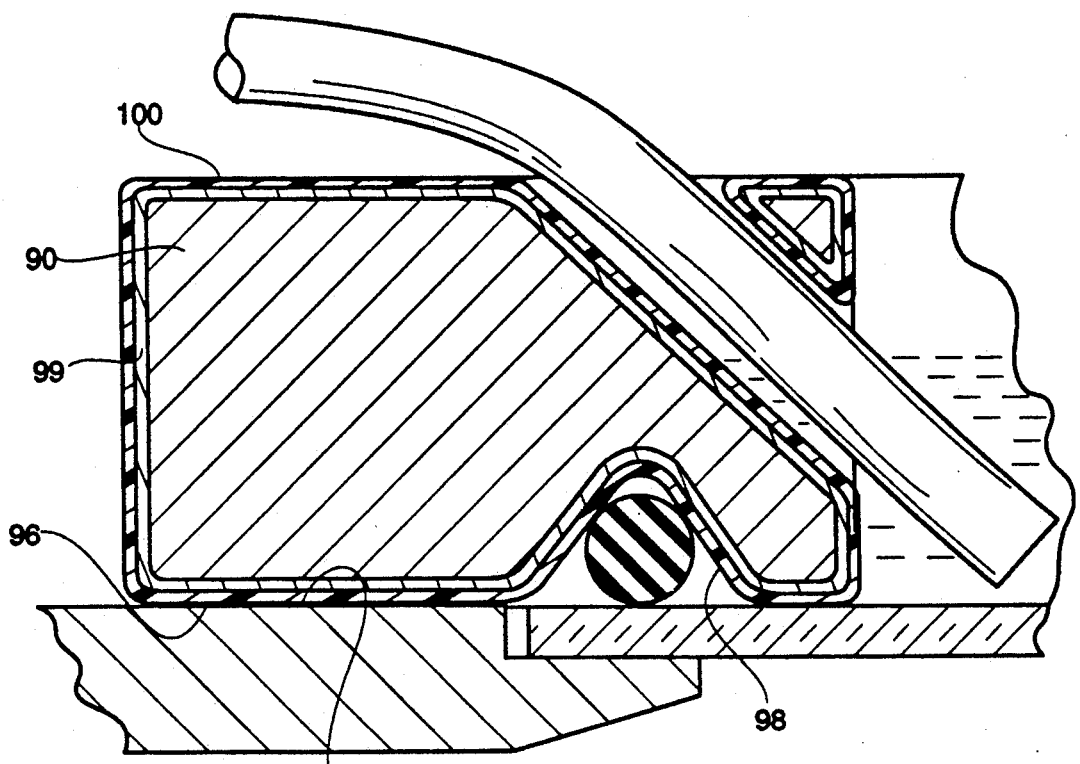
FIG. 6 is a vertical sectional view through a portion of the coverslip assembly and is taken along line 6—6 of FIG. 4.

As best shown in FIG. 3A and FIG. 6, the specimen chamber/coverslip assembly 26 comprises a lower coverslip glass 80 which is received in a counterbored central opening 82 in the center of the support plate 22 on an annular shoulder 84 formed in the support plate 22 and spaced between a top surface 85 thereof. Received above the coverslip glass 80 is an elastomeric O-ring 86 and above the O-ring 86 is a specially constructed rectangular plate or block 90 which has a central cylindrical opening 92 having a cylindrical wall 93 therein defining a specimen chamber 94 (FIG. 9).

Figure 5:
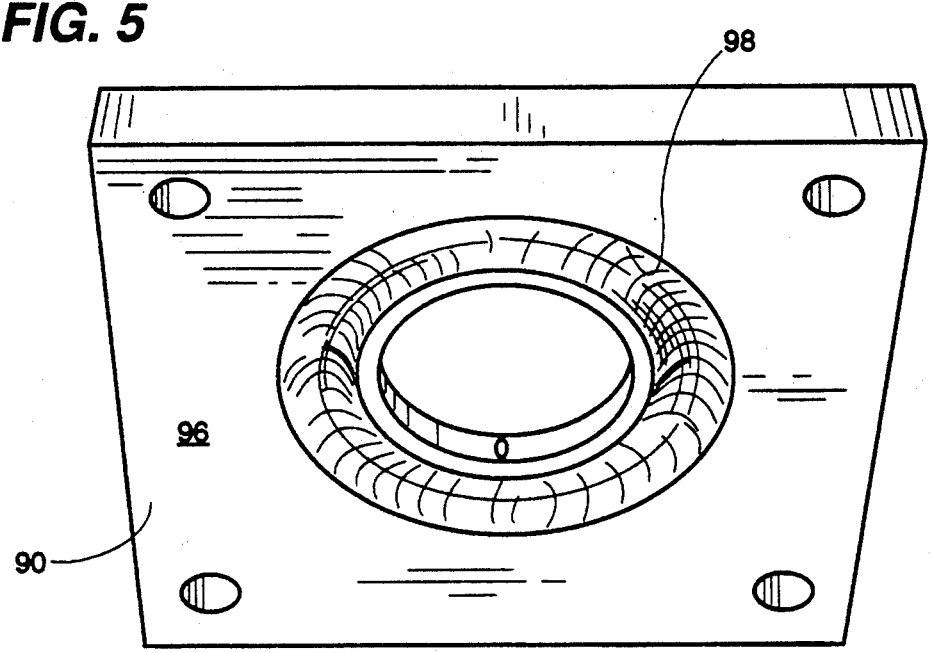
FIG. 5 is a bottom perspective view of the plate of the specimen chamber/coverslip assembly and is taken along line 5—5 of FIG. 3A.

As best shown in FIGS. 5 and 6, an underside 96 of the plate 90 has an annular groove 98 therein concentric with the center of the opening 92 in the plate 90 but having a larger diameter so that the groove 98 is spaced outwardly from the central cylindrical opening 92 in the plate 90. This annular groove 98 provides a seat 98 for the O-ring 86 with a small portion of the O-ring 86 extending below the underside or lower surface 96 of the plate 90 so that it can engage and be compressed against the coverslip glass 80 to seal the specimen chamber 94 (FIG. 9).

As best shown in FIG. 6, the plate 90 is formed of a thermally conductive metal, such as aluminum, and is then anodized with a dielectric coating 99. Then, surrounding this coating 100, as shown in an exaggerated manner in FIG. 6, is a coating of polytetrafluoroethylene (Teflon #) approximately 0.0005 to 0.002 inches thick whereby the plate 90 is completely insulated from the metal support plate 22.

As shown in FIG. 3A, the plate 90 has four counterbored corner holes 101, 102, 103 and 104 which receive therein a nylon shoulder washer 106 which insulates a fastener or screw 108 from the plate 90 when the plate 90 is secured to the support plate 22. As a result of the use of nylon shoulder washer 106 and coating of the plate 90 with a thin layer of polytetrafluoroethylene, the plate 90 is completely electrically insulated from the support plate 22.

Also, the specimen chamber 94 (FIG. 9) defined by the coverslip glass 80 and the coated cylindrical wall 93 of the cylindrical opening 92 in the plate 90 isolates the fluid in the specimen chamber 94 and the specimen itself from the metal of the plate 90. It has been found that less contamination is obtained with the use of a polytetrafluoroethylene coating on the wall 93 of the specimen chamber 94.

The plate 90, nylon washer 106 and screw fastener 108 are shown in an enlarged exploded perspective view in FIG. 3B.

As shown in FIGS. 2 and 3A, the plate 90 has three holes 111, 112 and 113 that extend angularly downwardly and centrally inwardly from a top surface 114 of the plate 90 and open onto the cylindrical wall 93.

The first hole 111 is provided for receiving a perfusion fluid tubing 116 which supplies perfusion fluid to the specimen chamber 94. The hole 113 diametrically opposite that hole 111 receives aspiration tubing 118 which is utilized for educing or withdrawing perfusion fluid, such as by use of a vacuum, from the specimen chamber 94. The other hole 112 is provided for receiving a temperature sensor 120 at the end of an electrical cord 121, as best shown in FIGS. 4, 9 and 10. The temperature sensor 120, of course, is utilized to sense the temperature of the fluid in the specimen chamber 94 and, accordingly, of the specimen itself.

The support plate 22 is also provided with a grounding pin or screw 122 which is typically a small diameter short screw 122 which is screwed through a hole 124 (FIG. 4) in the support plate 22 from the bottom side or underside 126 of the support plate 22 and has a portion of the screw 122 extending upwardly. Although not shown, it is to be understood that the screw head of this screw 122 can have serrations for providing a self clinching locking of the short screw 122 to the support plate 22. Screws and nuts having such serrations are sold under the trade name PEM NUTS.

As shown in FIG. 3A, an alligator clip 128 at the end of a wire conductor 130 is connected to the upwardly extending end of the screw 122 and is connected to a ground potential for grounding the support plate 22.

Figure 7:
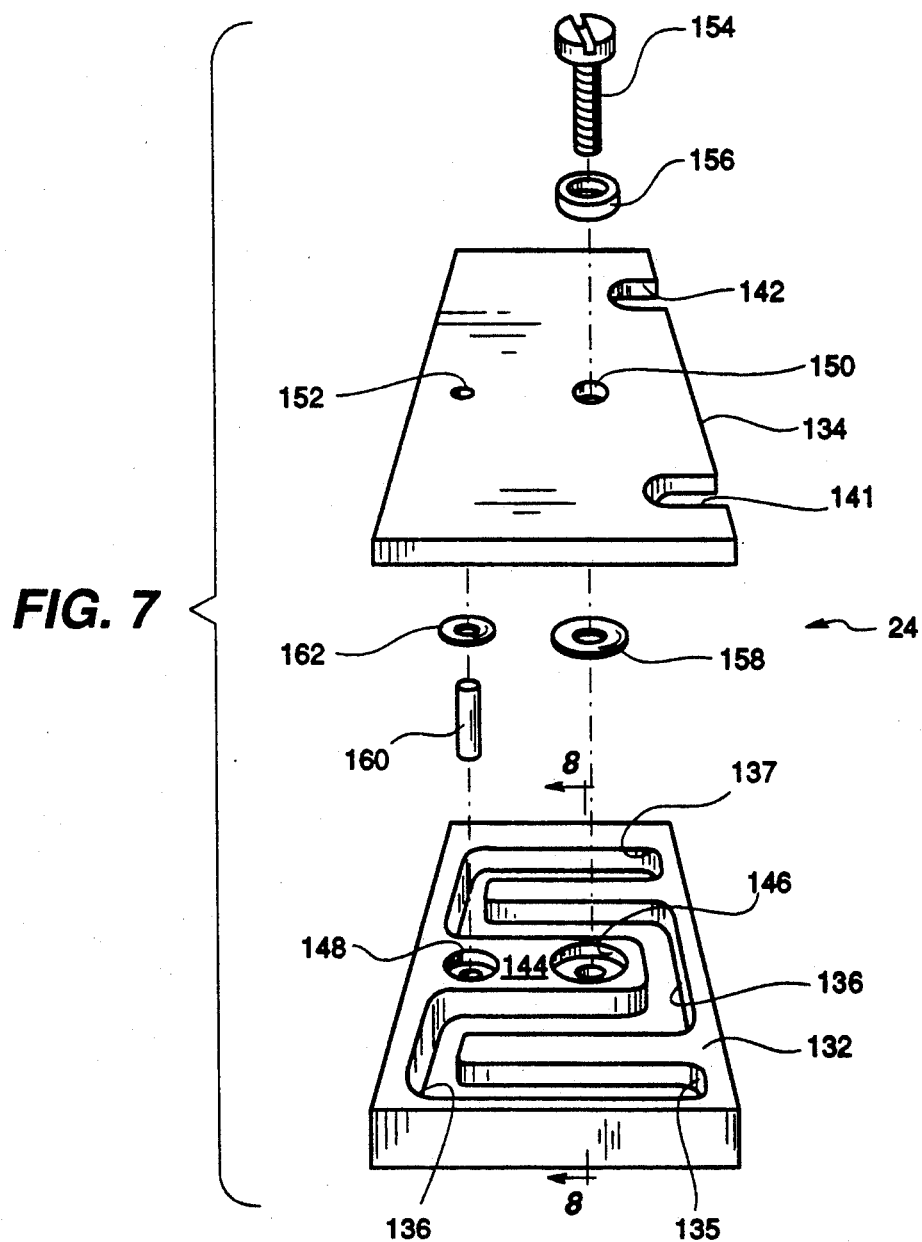
FIG. 7 is an exploded perspective view of the preheater/cooler assembly which is constructed according to the teachings of the present invention and which is mounted on the stage support plate shown in FIGS. 3 and 4.

As best shown in FIG. 7, the perfusion fluid preheater/cooler assembly 24 comprises a lower plate 132 and an upper plate 134. The lower plate 132 has an undulating or serpentine trough or slot 136 therein for providing a fluid path longer than the length of the lower plate 132 between trough end 135 and trough end 137 for the piece of perfusion tubing 116 which is received in the undulating trough 136. The upper plate 134 has two spaced apart U-shaped notches 141 and 142 in one edge therein, one, notch 141, for allowing the perfusion tubing 116 to enter the end 135 of the undulating slot 136 and one, notch 142, for allowing the tubing 116 to exit the end 137 of the undulating slot 136. A central upper surface 144 of the lower plate 132 has two counterbored holes 146 and 148 therein which mate with respective holes 150 and 152 in the upper plate 134. As shown, a screw fastener 154 is received through a washer 156 and then through the hole 150, next through an O-ring 158 that is received in the counterbored hole 146 and through the counterbored hole 146 and screw threadedly fastened to the support plate 22. The other hole 148 in the lower plate 132 receives a pin 160 which then extends through an O-ring 162 received in the counterbored hole 148 in the lower plate 132 and into a hole 164 (FIGS. 11 and 12) in the support plate 22. The pin 160 serves the function of preventing relative rotation between the upper plate 132, the lower plate 134 and the support plate 22 and to prevent rotational movement of the preheater/cooler assembly 24 on the support plate 22.

Figure 8:
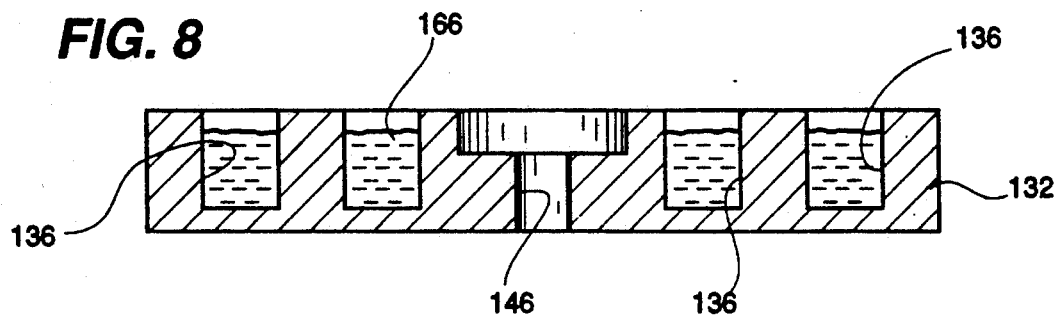
FIG. 8 is a vertical sectional view through a bottom plate of the assembly shown in FIG. 7 and is taken along line 8—8 of FIG. 7.

The undulating or serpentine trough or slot 136 in the lower plate 134 receives water 166 (FIGS. 8, 9 and 10) therein which serves as a heat transfer medium between the lower plate 134 and the tubing 116 received therein, as shown in FIGS. 9 and 10.

As shown in FIGS. 2 and 4, a perfusion fluid is supplied through the tubing 116 which extends through the notch 141 in the upper plate 132 and the preheater/cooler assembly 24. The perfusion tubing 116 then extends through the serpentine or undulated trough or slot 136 in the lower plate 132 of the preheater/cooler assembly 24 and then exits through the notch 142 in the upper plate 134 and extends into the hole 111 in the plate 90 to the specimen chamber 94 where perfusion fluid is injected into the specimen chamber 94. Then, as stated above, perfusion fluid is withdrawn or educed from the specimen chamber 94, such as with the use of a vacuum, through the outlet aspiration fluid tubing 118.

FIG. 9 shows the stage support plate 22, as shown in FIGS. 1 and 2, including a heat transfer/Peltier module 28 which heats and cools the support plate 22 and is controlled by an electronic temperature controller (not shown).

FIG. 10 shows a modified embodiment of the support plate 22 with some detail omitted to show a sheet heater 180 which is mounted to the underside of the support plate 22 and which has a non-inductive electric heating conductor 182 mounted therein.

FIG. 11 is a bottom plan view of the support plate 22 shown in FIG. 10 and shows the sheet heater 180 mounted to the underside of the support plate.

Figure 12:
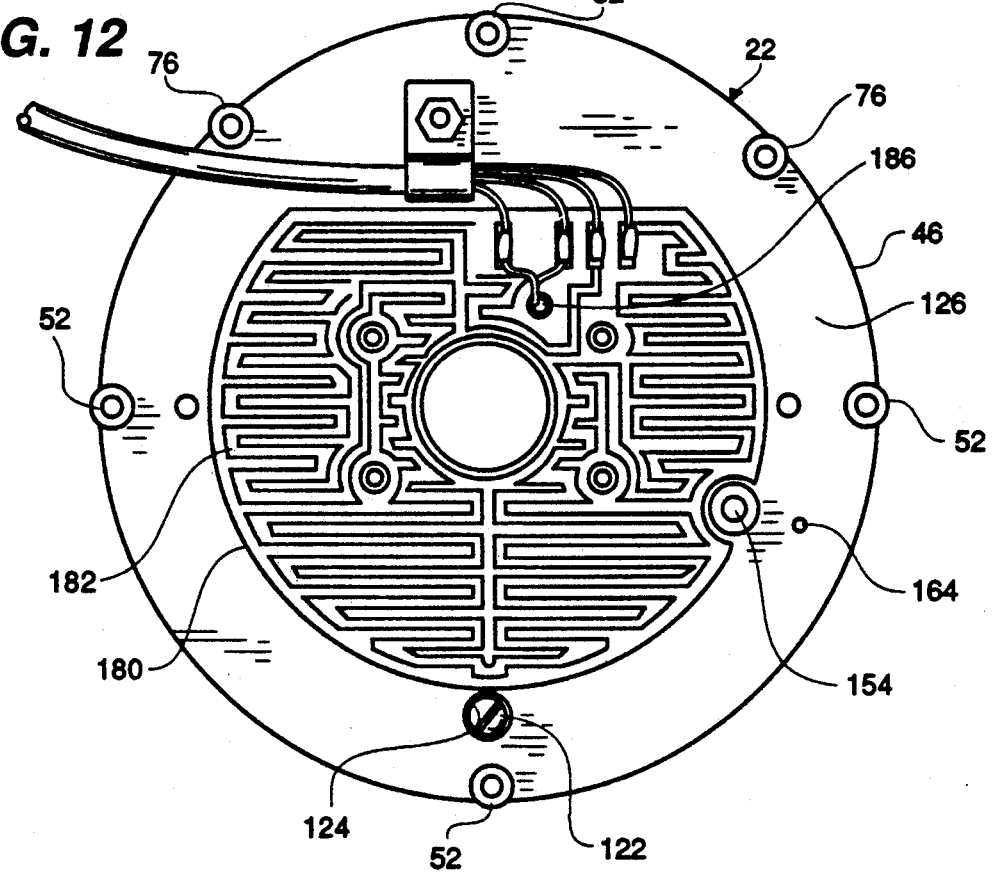
FIG. 12 is a bottom plan view of the stage support plate shown in FIG. 11 but with an insulating cover removed to show the non-inductive heating circuit in the sheet heater mounted to the underside of the support plate.

FIG. 12 shows the covering of the sheet heater 180 removed to show a non-inductive conductive strip 182 that is formed on the sheet heater 180 and which is supplied with electrical current to heat the support plate 22.

This modified embodiment can include a temperature sensor 186 for sensing the temperature of the support plate 22 whereby the warming or heating of the stage support plate 22 can be controlled. This modified embodiment is less expensive than the stage support plate assembly shown in FIG. 9, since the sheet heater 180 is much less expensive than a combination heat transfer/Peltier module 28. From the foregoing description, it will be apparent that the microscope stage assembly 20 of the present invention has a number of advantages, some of which have been described above and others of which are inherent in the invention.

Also, it will be apparent that modifications can be made to the microscope stage assembly 20 of the present invention without departing from the teachings of the invention. Accordingly, the scope of the invention is only to be limited as necessitated by the accompanying claims.

I claim:

1. A stage assembly for use in a microscope comprising:

a mechanical stage having a opening therein;

a stage support plate having an opening therethrough;

means for supporting said stage support plate in said opening in said mechanical stage;

means for heating/cooling or warming said stage support plate mounted to said stage support plate outside of a specimen chamber;

a specimen chamber/coverslip assembly mounted on top of said stage support plate above said opening therethrough;

a perfusion fluid preheater/cooler assembly mounted on top of said stage support plate;

a perfusion fluid tubing extending through said preheater/cooler assembly and to a specimen chamber in said specimen chamber/coverslip assembly; and means for withdrawing perfusion fluid from said specimen chamber.

2. The stage assembly of claim 1 wherein said preheater/cooler assembly includes heat transfer means mounted to said support plate in thermally conductive contact with said perfusion fluid tubing.

3. The stage assembly of claim 1 wherein said preheater/cooler assembly comprises a metal block fixed to said support plate and having a passageway therethrough filled with heat transfer liquid, said perfusion fluid tubing being received through said passageway.

4. A stage assembly for use in a microscope comprising:

a mechanical stage having a opening therein;

a stage support plate having an opening therethrough;

means for supporting said stage support plate in said opening in said mechanical stage;

means for heating/cooling or warming said stage support plate mounted to said support plate;

a specimen chamber/coverslip assembly mounted on said support plate above said opening therethrough;

a perfusion fluid preheater/cooler assembly mounted on said support plate;

a perfusion fluid tubing extending through said preheater/cooler assembly and to a specimen chamber in said specimen chamber/coverslip assembly;

means or withdrawing perfusion fluid from said specimen chamber;

said preheater/cooler assembly comprising a metal block fixed to said support plate and having a passageway therethrough filled with heat transfer liquid, said perfusion fluid tubing being received through said passageway and said block defining a lower plate having an undulating or serpentine trough having a first end adjacent a side edge of said plate and a second end spaced from said first end and located adjacent said side edge of said plate, and said preheater/cooler assembly further including an upper cover plate having a first notch in a side edge thereof positioned above said first end of said trough and a second notch in a side edge thereof positioned above said second end of said trough, and means for securing said lower and upper plates to an upper surface of said support plate, said notches providing inlet and outlet openings for said perfusion fluid tubing into and out of said preheater/cooler assembly.

5. The stage assembly of claim 1 wherein said specimen chamber/coverslip assembly includes a heat conductive plate having a specimen receiving opening therein in registry with the opening in said support plate, a coverslip glass located beneath said plate and in contact with the area of said support plate around said opening therethrough, and sealing means around said specimen receiving opening between the underside of said plate and the upper surface of said coverslip glass.

6. A stage assembly for use in a microscope comprising:

a mechanical stage having a opening therein;
a stage support plate having an opening therethrough;
means for supporting said stage support plate in said opening in said mechanical stage;
means for heating/cooling or warming said stage support plate mounted to said support plate;
a specimen chamber/coverslip assembly mounted on said support plate above said opening therethrough;
a perfusion fluid preheater/cooler assembly mounted on said support plate;
a perfusion fluid tubing extending through said preheater/cooler assembly and to a specimen chamber in said specimen chamber/coverslip assembly;
means for withdrawing perfusion fluid from said specimen chamber;
said specimen chamber/coverslip assembly including a heat conductive plate having a specimen receiving opening therein in registry with the opening in said support plate, a coverslip glass located beneath said plate and in contact with the area of said support plate around said opening therethrough, and sealing means around said specimen receiving opening between the underside of said plate and the upper surface of said coverslip glass;
said underside of said plate having a continuous groove or seat therein around the opening through said plate; and,
said sealing means comprising an elastomeric O-ring received in said continuous groove.

7. A stage assembly for use in a microscope comprising:

a mechanical stage having a opening therein;
a stage support plate having an opening therethrough;
means for supporting said stage support plate in said opening in said mechanical stage;
means for heating/cooling or warming said stage support plate mounted to said support plate;
a specimen chamber/coverslip assembly mounted on said support plate above said opening therethrough;
a perfusion fluid preheater/cooler assembly mounted on said support plate;
a perfusion fluid tubing extending through said preheater/cooler assembly and to a specimen chamber in said specimen chamber/coverslip assembly;
means for withdrawing perfusion fluid from said specimen chamber;
said specimen chamber/coverslip assembly including a heat conductive plate having a specimen receiving opening therein in registry with the opening in said support plate, a coverslip glass located beneath said plate and in contact with the area of said support plate around said opening therethrough, and sealing means around said specimen receiving opening between the underside of said plate and the upper surface of said coverslip glass;
said plate having a dielectric coating and a second outer coating of polytetrafluoroethylene (Teflon#) thereby to minimize contamination of a specimen or specimen fluid received in the specimen chamber defined between the coverslip glass and the polytetrafluoroethylene coated wall of said opening through said plate.

8. A stage assembly for use in a microscope comprising:

a mechanical stage having a opening therein;
a stage support plate having an opening therethrough;
means for supporting said stage support plate in said opening in said mechanical stage;
means for heating/cooling or warming said stage support plate mounted to said support plate;
a specimen chamber/coverslip assembly mounted on said support plate above said opening therethrough;
a perfusion fluid preheater/cooler assembly mounted on said support plate;
a perfusion fluid tubing extending through said preheater/cooler assembly and to a specimen chamber in said specimen chamber/coverslip assembly;
means for withdrawing perfusion fluid from said specimen chamber;

said specimen chamber/coverslip assembly including a heat conductive plate having a specimen receiving opening therein in registry with the opening in said support plate, a coverslip glass located beneath said plate and in contact with the area of said support plate around said opening therethrough, and sealing means around said specimen receiving opening between the underside of said plate and the upper surface of said coverslip glass;

said plate having two diametrically opposed angular holes extending from a top surface of said plate downwardly, and centrally inwardly, and opening onto said wall of said opening in said plate, said first hole receiving an end portion of the perfusion fluid tubing, and said withdrawing means comprising a perfusion fluid outlet tubing having an end portion received in said second hole.

9. A stage assembly for use in a microscope comprising:
a mechanical stage having a opening therein;
a stage support plate having an opening therethrough;
means for supporting said stage support plate in said opening in said mechanical stage;
means from heating/cooling or warming said stage support plate mounted to said support plate;
a specimen chamber/coverslip assembly mounted on said support plate above said opening therethrough;
a perfusion fluid preheater/cooler assembly mounted on said support plate;
a perfusion fluid tubing extending through said preheater/cooler assembly and to a specimen chamber in said specimen chamber/coverslip assembly;
means for withdrawing perfusion fluid from said specimen chamber;
said specimen chamber/coverslip assembly including a heat conductive plate having a specimen receiving opening therein in registry with the opening in said support plate, a coverslip glass located beneath said plate and in contact with the area of said support plate around said opening therethrough, and sealing means around said specimen receiving opening between the underside of said plate and the upper surface of said coverslip glass;
said plate having a hole extending from an upper surface thereof to said wall of said opening through said plate for receiving a temperature sensor which is positioned in said specimen chamber for sensing the temperature of liquid therein.

10. A stage assembly for use in a microscope comprising:
a mechanical stage having a opening therein;
a stage support plate having an opening therethrough;
means for supporting said stage support plate in said opening in said mechanical stage;
means for heating/cooling or warming said stage support plate mounted to said support plate;
a specimen chamber/coverslip assembly mounted on said support plate above said opening therethrough;
a perfusion fluid preheater/cooler assembly mounted on said support plate;
a perfusion fluid tubing extending through said preheater/cooler assembly and to a specimen chamber in said specimen chamber/coverslip assembly;
means for withdrawing perfusion fluid from said specimen chamber;
said specimen chamber/coverslip assembly including a heat conductive plate having a specimen receiving opening therein in registry with the opening in said support plate, a coverslip glass located beneath said plate and in contact with the area of said support plate around said opening therethrough, and sealing means around said specimen receiving opening between the underside of said plate and the upper surface of said coverslip glass; and,
said plate being secured in an electrically insulated manner to said support plate around the opening in said support plate.

11. The stage assembly of claim 1 wherein said heating or cooling means comprises a combination heat transfer/Peltier module mounted to said support plate.

12. The stage assembly of claim 1 wherein said heating means includes a sheet heater mounted to said support plate and having a non-inductive conductive strip thereon for electrically heating said support plate.

13. A stage assembly for use in a microscope comprising:
a mechanical stage having a opening therein;
a stage support plate having an opening therethrough;
means for supporting said stage support plate in said opening in said mechanical stage;
means for heating/cooling or warming said stage support plate mounted to said support plate;
a specimen chamber/coverslip assembly mounted on said support plate above said opening therethrough;
a perfusion fluid preheater/cooler assembly mounted on said support plate;
a perfusion fluid tubing extending through said preheater/cooler assembly and to a specimen chamber in said specimen chamber/coverslip assembly;
means for withdrawing perfusion fluid from said specimen chamber;
said support means in said opening in said mechanical stage including at least three spaced apart ledges extending inwardly from a wall of said opening through said mechanical stage, each being adapted to receive an support thereon, a support member mounted to said support plate.

14. A stage assembly for use in a microscope comprising:
a mechanical stage having a opening therein;
a stage support plate having an opening therethrough;
means for supporting said stage support plate in said opening in said mechanical stage;
means for heating/cooling or warming said stage support plate mounted to said support plate;
a specimen chamber/coverslip assembly mounted on said support plate above said opening therethrough;
a perfusion fluid preheater/cooler assembly mounted on said support plate;
a perfusion fluid tubing extending through said preheater/cooler assembly and to a specimen chamber in said specimen chamber/coverslip assembly;

means for withdrawing perfusion fluid from said specimen chamber;

said support plate having at least three spaced apart holes therein adjacent the peripheral edge of said support plate and a plastic shoulder washer including a stem and an annular flange received in each of said openings with a portion of each annular flange extending beyond said peripheral edge of said support plate and adapted to sit on one of said ledges with the outer edge of said annular flange located adjacent to the wall of said opening through said mechanical stage thereby to electrically and thermally isolate said support plate from said mechanical stage.

15. The stage assembly of claim 13 wherein at least one of said ledges has side edges extending inwardly from the wall of said opening through said mechanical stage and said support plate has spaced apart plastic stops mounted to the underside thereof and adapted to be positioned, respectively, adjacent one side edge of at least one of said ledges for locating said support plate in said opening in said mechanical stage and for preventing movement of said support plate in said opening in said mechanical stage.

16. The stage assembly of claim 1 wherein said support plate has a grounding pin extending therefrom to which a ground conductor can be attached.

17. The stage assembly of claim 1 wherein said preheater/cooler assembly is mounted to said support plate by one fastener and has means for preventing relative movement between said preheater/cooler assembly and said support plate.

* * * * *

UNITED STATES PATENT AND TRADEMARK OFFICE
CERTIFICATE OF CORRECTION

PATENT NO. : 5,181,382
DATED : January 26, 1993
INVENTOR(S) : Thomas F. Middlebrook It is certified that error appears in the above-identified patent and that said Letters Patent is hereby corrected as shown below:

Column 9, line 16 "means or" should be --means for--

Column 12, line 49 "receive an" should be --receive and--

Signed and Sealed this

Twenty-first Day of December, 1993

Attest:

BRUCE LEHMAN

Attesting Officer          Commissioner of Patents and Trademarks